United States Patent
Desai et al.

(10) Patent No.: US 7,624,177 B2
(45) Date of Patent: Nov. 24, 2009

(54) SYSLOG MESSAGE HANDLING

(75) Inventors: Neeshant Desai, Auburn, CA (US);
Adrian Cowham, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 950 days.

(21) Appl. No.: 11/137,885

(22) Filed: May 25, 2005

(65) Prior Publication Data

US 2006/0271826 A1 Nov. 30, 2006

(51) Int. Cl.
*G06F 15/173* (2006.01)
(52) U.S. Cl. .................... 709/224; 726/22; 714/39
(58) Field of Classification Search ............. 709/223, 709/224; 726/22, 23; 714/37, 39, 47, 48; 707/6
See application file for complete search history.

(56) References Cited

U.S. PATENT DOCUMENTS 6,769,079 B1 * 7/2004 Currey et al. ................. 714/45

OTHER PUBLICATIONS

Clarke et al. "Context grep" Technical Report CS-96-41, University of Waterloo, Nov. 30, 1996, 11 pages.*
Bing et al. "Extending UNIX System Logging with SHARP" Proceedings of the 14th Systems Administration Conference (LISA 2000), Dec. 2000, 9 pages.*
Hansen et al. "Automated system monitoring and notification with Swatch", In Proceedings of LISA, 1993, 8 pages.*
Lonvick, RFC 3165—"The BSD Syslog Protocol" 2001.*
Lonvick, Chris, "RFC 3164—The BSD Syslog Protocol," http://www.faqs.org/rfcs/rfc3164.html, The Internet Society 2001, pp. 1-23.

* cited by examiner

*Primary Examiner*—David Lazaro (57) ABSTRACT

A method for processing syslog messages. The syslog messages are received from a plurality of components. The method includes receiving a first syslog message. The method further includes determining whether the first syslog message is one of a plurality of critical syslog messages. The method also includes, if the first syslog message is the one of the plurality of critical syslog messages, performing critical message handling using the first syslog message. The method yet also includes, if the first syslog message is not any of the plurality of critical syslog messages, performing non-critical message handling using the first syslog message.

12 Claims, 8 Drawing Sheets

`<\d{2}>\sFeb\s\d{2}\s\d{2}:\d{2}:\d{2}\s\S{0,15}\s\S.{1,3}:.*`

| | |
|---|---|
| 502 — Priority | `<\d{1,3}>|\d{1,3}` |
| 504 — Timestamp | `Jan|Feb|Mar|Apr|May|Jun|Jul|Aug|Sep|Oct|Nov|Dec\s\d{d}|\s\s\d{1}\s\d{2}:\d{2}:\d{2}` |
| 506 — Hostname | `\s\S{0,15}` |
| 508 — Tag | `{0,31}(:|[)\s` |
| 510 — Content | `*` |

SYSLOG MESSAGE HANDLING

RELATED APPLICATIONS

The invention is related to a commonly-assigned patent application entitled "PATTERN MATCHING ALGORITHM TO DETERMINE VALID SYSLOG MESSAGES" Ser. No. 11/138,530, by the same inventors herein, filed herewith and incorporated by reference herein.

BACKGROUND OF THE INVENTION

A system may include of one or more computers (including a syslog server) connected to a plurality of devices (e.g., printers, scanners, modems, etc.). As the devices communicate among themselves, the syslog server continuously receives incoming syslog messages. As discussed herein, syslog messages (such as those defined in "Request for Comments (RFC) 3164: The BSD Syslog Protocol") are small textual messages sent by a plurality of devices. The small textual messages may relay a variety of information (e.g., log data) to a central repository such as a syslog server.

There may be multiple ways of handling incoming syslog messages. The syslog message may, for example, handle incoming syslog messages using a buffer. A buffer allows for temporary storage of syslog messages while the syslog messages are waiting to be processed. However, a buffer is generally limited in size and may not be able to handle bursts of syslog messages. For example, during a period when a high volume of syslog messages may be received, the buffer may reach its capacity and may be unable to handle additional incoming syslog messages. The overflowing syslog messages may be dropped and consequently, never get processed by the syslog server.

One type of syslog messages that may require immediate handling is a critical syslog message. As discussed herein, a critical syslog message is a syslog message that may require the system to perform error handling. In the prior art, there is no differentiation between critical syslog messages and non-critical syslog messages. Thus, critical syslog messages are generally processed similarly to non-critical syslog messages. Since critical syslog messages are handled in the same manner as non-critical syslog messages, an incoming syslog message may be queued behind non-critical syslog messages. Accordingly, the handling of the critical syslog message may be delayed. In the case of buffer overflow, the critical syslog message may even be dropped.

The syslog server may also handle incoming syslog messages by creating a thread to handle each syslog message. A disadvantage to this method is that a large number of threads may be running at the same time if there is a burst of syslog messages. Consequently, a large number of threads being active at the same time may result in an excessive resource drain against the system.

Prior to being accepted and processed by a syslog server, each incoming syslog message is checked for validity. Syslog messages are checked for validity because, for example, a malformed syslog message can be detrimental to the system, such as compromising system security. Parsing is a method currently employed to validate syslog messages.

The incoming syslog messages are checked using a parsing algorithm (such as a sequential parsing algorithm). As discussed herein, parsing refers to the process of splitting up a continuous stream of characters. The codes used to implement parsing may be long and complex depending upon the programming language that may have been used to write the codes. Since each computer system may use a different programming language, different versions of the codes in different languages may have to be programmed to perform parsing. Note that if any part of the syslog message is considered invalid, then the syslog server may stop the sequential parsing process and discard the syslog message that is currently being verified.

As discussed, there existed different methods for handling incoming syslog messages. Some methods may result in syslog messages being dropped. Other methods may cause a drain in the system resources. Regardless of the methods, the prior art handling of critical syslog messages may be delayed or the critical syslog messages may be dropped because the critical syslog messages are not queued and/or handled differently from other non-critical messages.

Timely handling of syslog messages is further hindered by the parsing algorithm that is commonly employed to analyze the validity of each syslog message. The parsing algorithm is inefficient because parsing generally requires the syslog server to analyze each field in an orderly manner. Additionally, codes for the parsing algorithm can become long and complicated. Hence, changes in the RFC 3164 standards or in the programming language can result in extensive code changes. Further, the parsing algorithm may be written in a programming language that is specific to a platform and may not be easily portable to another platform without incurring significant cost to rewrite the codes.

SUMMARY OF INVENTION

The invention relates, in an embodiment, to a method for processing syslog messages. The syslog messages are received from a plurality of components. The method includes receiving a first syslog message. The method further includes determining whether the first syslog message is one of a plurality of critical syslog messages. The method also includes, if the first syslog message is the one of the plurality of critical syslog messages, performing critical message handling using the first syslog message. The method yet also includes, if the first syslog message is not any of the plurality of critical syslog messages, performing non-critical message handling using the first syslog message.

In another embodiment, the invention relates to an article of manufacture comprising a program storage medium having computer readable code embodied therein. The computer readable code is configured to process syslog messages received from a plurality of components. The article of manufacture includes computer readable code for receiving a first syslog message. The article of manufacture further includes computer readable code for determining whether the first syslog message is one of a plurality of critical syslog messages. The article of manufacture also includes computer readable code for performing critical message handling, if the first syslog message is the one of the plurality of critical syslog messages, using the first syslog message. The article of manufacture yet further includes computer readable code for performing non-critical message handling. If the first syslog message is not any of the plurality of critical syslog messages, then use the first syslog message.

In yet another embodiment, the invention relates to a method for processing syslog messages. The syslog messages are received from a plurality of components. The method includes receiving a first syslog message. The method further includes determining whether the first syslog message is one of a plurality of critical syslog messages. The method also includes, if the first syslog message is the one of the plurality of critical syslog messages, clearing a syslog queue and placing the first syslog message. After the clearing, on the syslog queue, the syslog queue represents a queue where syslog messages are retrieved for handling by a processor in the computer system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As mentioned above, the syslog server in the prior art has a difficult time handling bursts of syslog messages. When the buffer is not able to handle additional incoming syslog messages, the system may drop these additional incoming syslog messages. Another problem in the prior art is the failure to timely handle critical syslog messages (i.e., syslog messages that may require the system to perform error handling). Since critical syslog messages are not queued and/or handled differently from non-critical syslog messages, the handling of critical syslog messages may be delayed or the critical syslog messages may even be dropped.

Figure 1A:
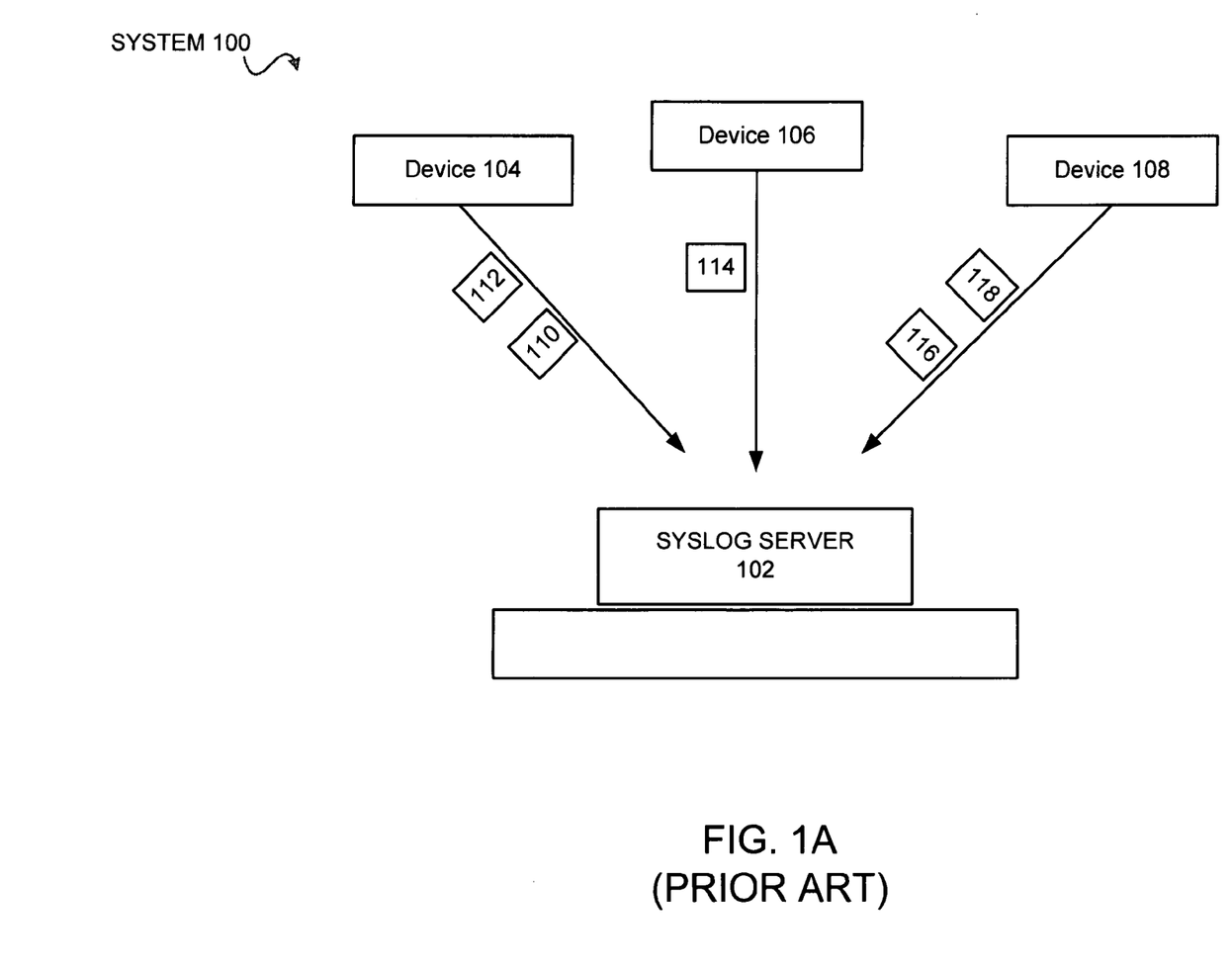
FIG. 1A shows a system diagram with multiple devices sending syslog messages to a syslog server.

To facilitate discussion, prior art FIG. 1A shows a system diagram with multiple devices sending syslog messages to a syslog server. System 100 includes a syslog server 102 connected to a plurality of devices (devices 104, 106, and 108). Each of the devices is sending a plurality of syslog messages (110, 112, 114, 116, and 118) to syslog server 102. As the syslog messages are received, syslog server 102 buffers in the incoming syslog messages and processes the incoming syslog messages. However, when a burst of syslog messages is sent to syslog server 102, syslog server 102 may not have the capacity to handle all the incoming syslog messages. As a result, one or more syslog messages may be dropped; thus, some of the syslog messages may never be processed by syslog server 102.

For example, syslog server 102 receives a burst of syslog messages (110, 112, 114, and 116). Syslog server 102 is able to accommodate syslog messages (110, 112, and 114); however, the buffer for syslog server 102 has reached its capacity and is unable to accommodate syslog message 116. As a result, syslog message 116 is dropped and syslog server 102 never sees syslog message 116.

Using the same example, syslog message 118 is next sent to syslog server 102. Syslog message 118 is a critical syslog message. Syslog message 118 is treated like any other syslog message since there is no a mechanism in the prior art to inform the syslog server that a critical syslog message has been received. Consequently, syslog message 118 is not handled in a timely manner. Further, if the capacity of the buffer of syslog server 102 is still at its maximum, syslog message 118 may be dropped and may never be processed.

Figure 1B:
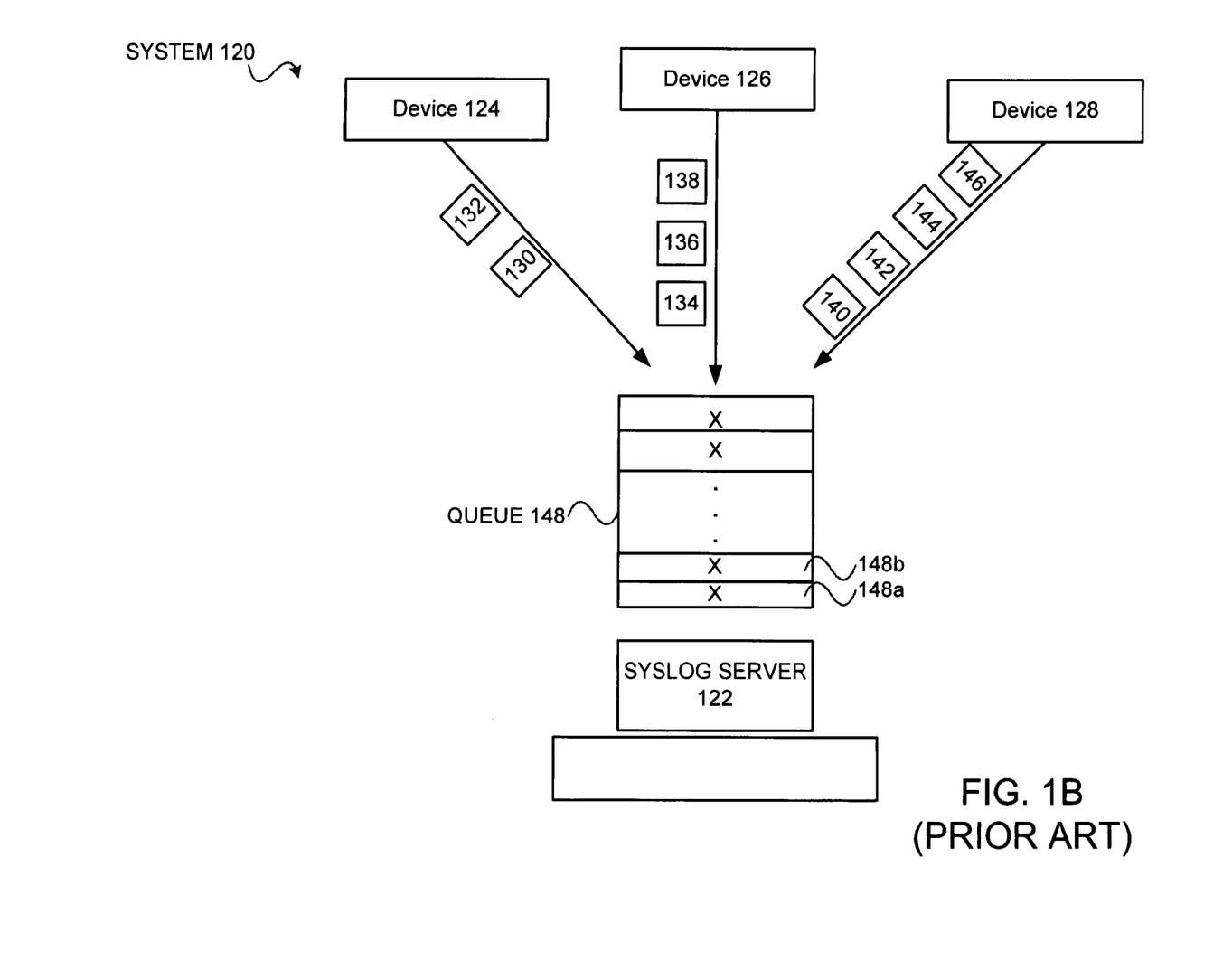
FIG. 1B shows a system diagram with multiple devices sending syslog messages, which are processed using a queue, to a syslog server.

To reduce the probability of syslog messages from being dropped, a queue may be used. Similar to prior art FIG. 1A, prior art FIG. 1B shows a system diagram with multiple devices sending syslog messages to a syslog server; however, the syslog messages are processed using a queue. System 120 includes a syslog server 122 connected to a plurality of devices (devices 124, 126, and 128). Each of the devices is sending a plurality of syslog messages (130, 132, 134, 146, 148, 140, 142, 144, and 146) to syslog server 122. As the syslog messages are received, they are entered into a queue 148 (e.g., first-in first-out queue), which enables the syslog messages to be processed in an orderly fashion. For example, since syslog message 148a is currently in the front of queue 148, syslog message 148a is processed prior to syslog message 148b. Even though queue 148 may prevent syslog messages (e.g., 130, 132, 134, 146, 148, 140, 142, 144, and 146) from being dropped, the queue does not solve the problem of the delay in handling critical syslog messages.

To reduce the volume of syslog messages that may be on a queue, threads may be employed to handle incoming syslog message. A disadvantage to this method is that a large number of threads may be running at the same time if there is a burst of syslog messages. The large number of concurrently executing threads causes a resource drain against the system.

As discussed above, another problem with the prior art is the speed at which a syslog message is handled. In handling syslog messages, a syslog server checks the validity of the syslog messages because a malformed syslog message can be detrimental to the system. A popular method currently employed to validate syslog messages is parsing.

Figure 2A:
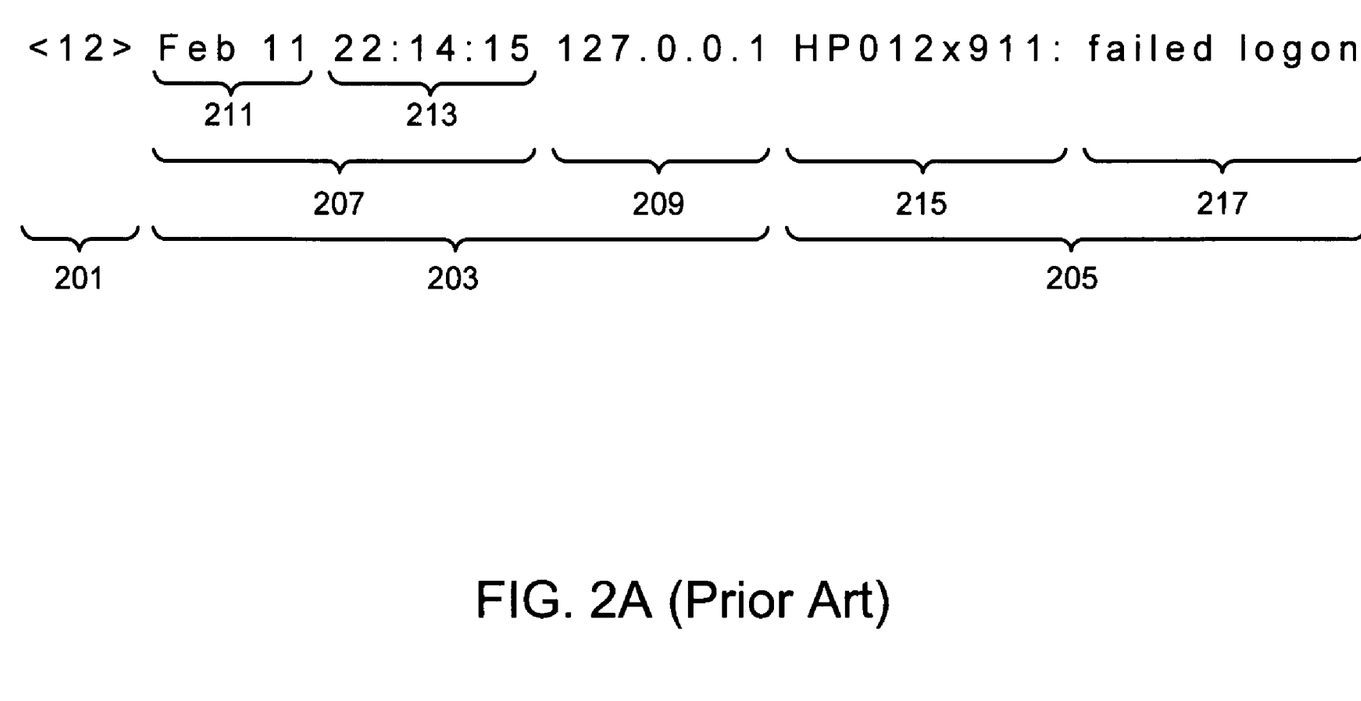
FIG. 2A shows an example of an incoming syslog message.

To facilitate discussion, prior art FIG. 2A shows an example of an incoming syslog message. Generally speaking, a syslog message includes three constituent message components: a priority field 201, a header field 203 and a message field 205. Priority field 201 (e.g., <12>) provides a value indicating the urgency of the syslog message. Header field 203 includes two fields: a timestamp field 207 and a hostname field 209. Timestamp field 207 includes a date field 211 and a time field 213. Date field 211 (e.g., Feb 11) provides the month and day that the syslog message is created. Time field 213 (e.g., 22:14:15) provides the hours, minutes and seconds that the syslog message is created.

Hostname field 209 (e.g., 127.0.0.1) provides the location address of the source device. Message field 205 includes a tag field 215 and a content field 217. Tag field 215 (e.g., HP012x911) provides the information about the process or program that sent the syslog message. Content field 217 (e.g., failed logon) provides the actual syslog message. The various fields mentioned above are described in detail in the "RFC 3164: The BSD Syslog Protocol" (RFC 3164). As RFC 3164 is well known to those skilled in the art, the standards will not be discussed in details herein.

Figure 2B:
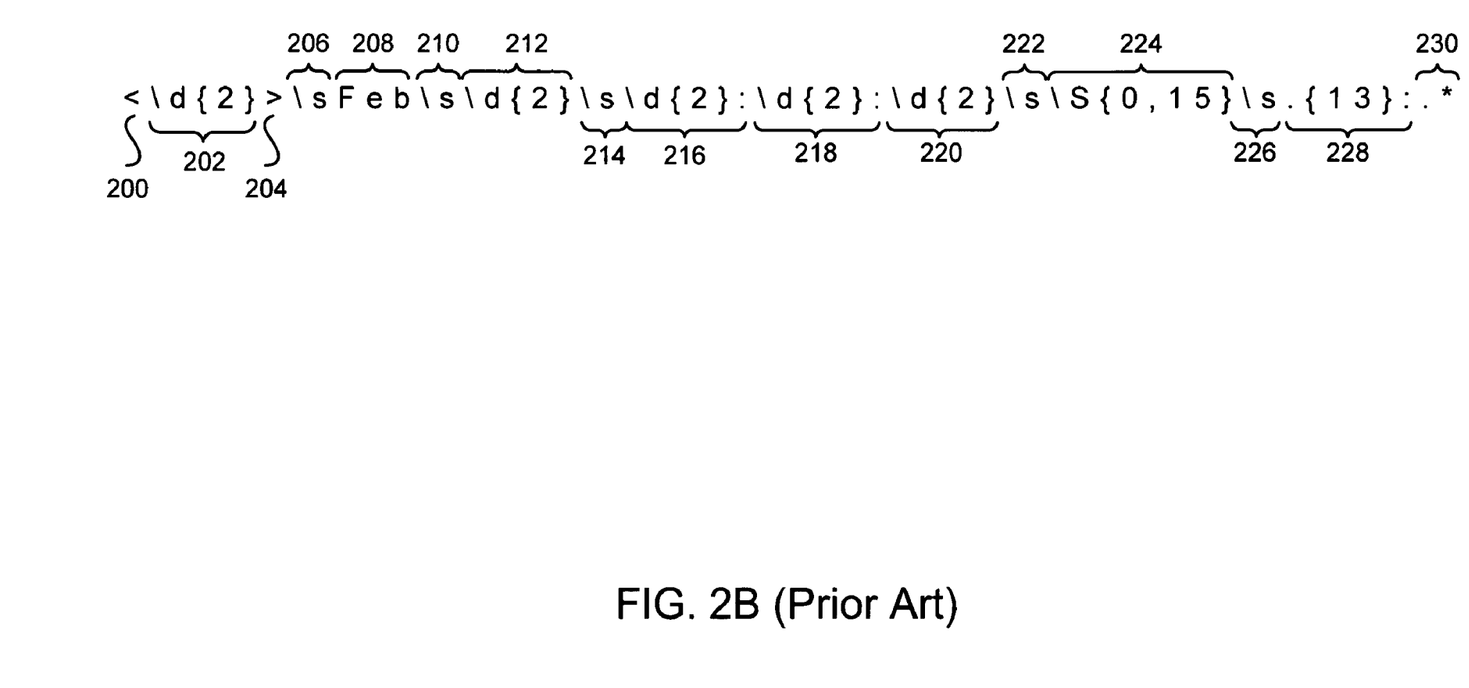
FIG. 2B shows an example of a sequential parsing algorithm that may be used to check a syslog message.

In the prior art, the incoming syslog messages are checked using a parsing algorithm. As discussed herein, parsing refers to the process of splitting up a continuous stream of characters into its constituent parts. Prior art FIG. 2B shows an example of a sequential parsing algorithm that may be employed to check a syslog message. Prior art FIG. 2B is discussed in relation to prior art FIG. 2A. Note that if any part of the syslog message is considered invalid, then the syslog server may stop sequential parsing process and discard the syslog message that is currently being verified.

To check priority field 201, fields 200, 202 and 204 in the sequential parsing algorithm are compared against priority field 201. According to the parsing algorithm, field 200 should be a left bracket, field 202 should contain 2 digits, and field 204 should be a right bracket. If the format and content for priority field 201 match these three fields, then priority field 201 is considered to be valid, and the syslog server checks the next field, header field 203.

Date field 211 is the first field checked in header field 203. Fields 206, 208, 210, and 212 in the sequential parsing algorithm are compared against date field 211. First, the syslog server checks for a space (field 206) between priority field 201 and date field 211. According to the parsing algorithm, fields 208 should contain the character "Feb," field 210 should be a space, and field 212 should contain 2 digits. If the format and content for date field 211 match these fields, then date field 211 is considered to be valid, and the syslog server proceeds to check the next part of header field 203.

Once date field 211 is checked, the syslog server checks time field 213. Fields 214, 216, 218, 220, 222, and 224 are compared against time field 213. First, the syslog server checks for a space (field 214) between date field 211 and time field 213. According to the parsing algorithm, fields 216 (e.g., hour), 220 (minutes) and 224 (seconds) should each contain 2 digits. Also, fields 218 (space between the hour and minutes) and 222 (space between the minutes and seconds) should each be a colon. If the format and content for time field 213 match these fields, then time field 213 is considered to be valid, and the syslog server proceeds to check the next part of header field 203, hostname field 209.

Fields 226 and 228 are compared against hostname field 209. First, the syslog server checks for a space (field 226) between time field 213 and hostname field 209. According to the parsing algorithm, field 228 should be a non-white space value that contains zero through 15 characters. If the format and content for hostname 110 match these fields, then hostname field 209 is considered to be valid, and the syslog server proceeds to check message field 205.

Tag field 215 is the first field checked in message field 205. First, the system checks for a space (field 230) between hostname field 209 and tag field 215. According to the parsing algorithm, field 232 should be a value from zero to 31 characters, and field 234 should be a colon. If the format and content for tag field 215 match these fields, then tag field 215 is considered to be valid, and the syslog server proceeds to check the final field, content field 217.

Field 236 in the parsing algorithm is compared against content field 217. According to the parsing algorithm, field 236 should be any character repeating. If the format and content for content field 217 match field 236, then content field 217 is considered to be valid, and the syslog server accepts the incoming syslog message as valid.

In accordance with embodiments of the present invention, there are provided a method for processing a plurality of syslog messages received from a plurality of components (e.g., devices such as printers, scanners, etc.). Before being processed, an incoming syslog message is characterized as being either a critical or a non-critical syslog message. As discussed herein, a critical syslog message is a syslog message that requires immediate handling. If the syslog message is one of a plurality of critical syslog messages, the syslog server performs critical message handling on a priority basis. However, if the syslog message is not one of a plurality of critical syslog messages, then the syslog server performs non-critical message handling in a first-come first-served manner.

For example, a component sends a syslog message to a syslog server. As the syslog message is received by the syslog server, a critical message handler analyzes the incoming syslog message to determine whether the incoming syslog message contains a unique string that indicates the syslog message to be one of a plurality of critical syslog messages. In an embodiment, the critical message handler compares the incoming syslog message against a critical message regular expression. As discussed herein, a critical message regular expression is a unique string that is not found in a non-critical syslog message. A critical message regular expression may be formed based on syslog message standards as defined in RFC 3164.

If an incoming syslog message matches the critical message regular expression then critical message handling occurs. As discussed herein, critical message handling refers to the process of clearing the syslog queue of all outstanding syslog messages and placing the critical syslog message into the syslog queue for immediate handling by the CPU. However, if the syslog message does not match the unique string then non-critical message handling occurs. As discussed herein, non-critical message handling refers to the process of placing a non-critical syslog message into a syslog queue from which syslog messages are subsequently retrieved and handled by the CPU. The process of handling a critical syslog message is the same as a non-critical syslog message once the critical syslog message is placed on the syslog queue.

By relocating the syslog messages to a syslog queue located on a memory, a system administrator is able to control the size of the syslog queue. Also, since the syslog messages are no longer waiting on the buffer to be handled by the processor, the risk of syslog messages being dropped is eliminated.

Syslog messages in the syslog queue are retrieved by a thread in a first-come first-server basis. The thread retrieves the syslog message at the front of the syslog queue and sends the syslog message to the processor. Once the processor has finished processing, the thread then retrieves the next syslog message from the syslog queue and sends the syslog message to the processor.

One function that a processor may perform is to validate all incoming syslog messages (i.e., both critical and non-critical syslog messages). As mentioned above, the process of validating syslog messages, in the prior art, generally involves utilizing a sequential parsing algorithm that is inefficient. To facilitate the validation process, embodiments of the present invention provide for a method of validating syslog messages having a plurality of message components using meta regular expression in a pattern-matching algorithm. As discussed herein, message components refer to the various constituent parts (i.e., priority field, header field, message field, etc.) of a syslog message. Also as discussed herein, meta regular expression is a string that includes all the possible combinations of regular expressions that may be found in a standard regular expression library and that may cover all valid syslog messages for a particular system.

Standards for a syslog message are currently defined in the "RFC 3164: The BSD Syslog Protocol" (RFC 3164). For example, the standards for the various different types of message components that may be part of a syslog message are defined in the RFC 3164. Common syntaxes that are defined in a standard regular expression library may be used to create regular expressions to represent the various message components. As discussed herein, a regular expression refers to a formula that describes a set of strings without having to actually list the elements.

Once regular expressions have been generated for each of the constituent message components of a syslog message, then these regular expresssions may be combined to form a plurality of valid message component patterns. As discussed herein, message component patterns refer to the various different ordering of individual regular expression. Using these valid message component patterns, a meta regular expression may be generated.

Instead of implementing a parsing algorithm, which usually requires multi-line codes that may be long and complex, an embodiment of the invention may employ a comparison mechanism such as a pattern-matching algorithm. Using a pattern-matching algorithm, the syslog server may compare an incoming syslog message with a meta regular expression to determine the validity of the incoming syslog message.

In an example, an incoming syslog message is received by a syslog server and is compared against a meta regular expression. If the incoming syslog message matches one of a plurality of message component patterns that may be found in the meta regular expression, the incoming syslog message is considered valid.

Figure 3:
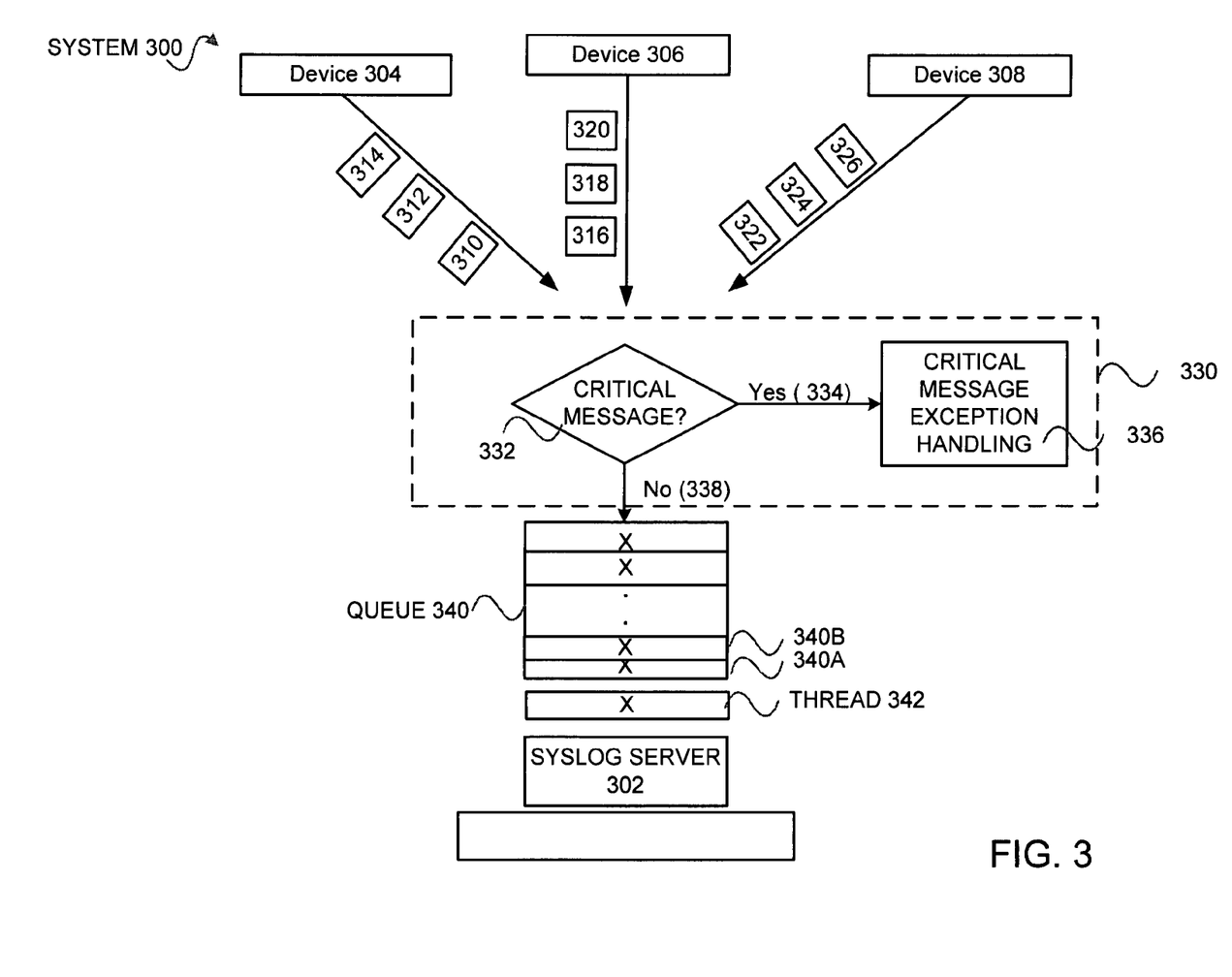
FIG. 3 shows, in an embodiment, a system diagram with multiple devices sending syslog messages to a syslog server, which has a syslog queue and a thread to handle incoming syslog messages.

The features and advantages of the invention may be better understood with reference to the figures and discussions that follow. FIG. 3 shows, in an embodiment, a system diagram with multiple components (e.g., devices) sending syslog messages to a syslog server, which has a syslog queue and a thread to handle incoming syslog messages. A system 300 includes a syslog server 302 connected to a plurality of devices (devices 304, 306, and 308). Each of the devices is configured to send a plurality of syslog messages (e.g., 310, 312, 314, 316, 318, 320, 322, 324, and 326) to syslog server 302. As the syslog messages are received, they are removed from the server buffer and stored in a syslog queue 340 (e.g., first-come first-serve syslog queue) located in memory, such as in a hard drive.

In an embodiment of the invention, critical syslog messages are handle immediately without requiring the critical syslog messages to wait in a syslog queue in the first-come first-serve order. As the syslog messages are received, a critical message handler 330 compares (step 332) the incoming syslog messages against a critical message regular expression. As aforementioned, a critical message regular expression is a unique string that is not found in a non-critical syslog message. If the incoming syslog message does not match the critical message regular expression (path 338), then the incoming syslog message is stored in syslog queue 340 and waits for a thread 342 to retrieve the syslog message for processing.

However, if the incoming syslog message matches the critical message regular expression (path 334) then critical message exception handling 336 occurs. In critical message exception handling 336, syslog queue 340 is cleared of all existing syslog messages. Then, the critical syslog message is placed into syslog queue 340 and retrieved by thread 342 for immediate processing.

By removing syslog messages from the buffer, the buffer does not overflow and cause syslog messages to be dropped. Instead, syslog messages are stored on syslog queue 340, which is located on a memory (e.g., hard drive). The size of syslog queue 340 may be determined by a system administrator. The system administrator may adjust the size of syslog queue 340 to enable the queue to have sufficient memory capacity to adequately handle fluctuations in the quantity of incoming syslog messages.

Syslog messages on syslog queue 340 are handled in a first-come first-serve basis. For example, syslog message 340A is currently the first syslog message in syslog queue 340. Thread 342 retrieves syslog message 340A from syslog queue 340 and sends syslog message 340A to the processor to be handled. Once syslog message 340A has been processed, thread 342 retrieves the next syslog message (340B) from syslog queue 340 for handling.

Figure 4:
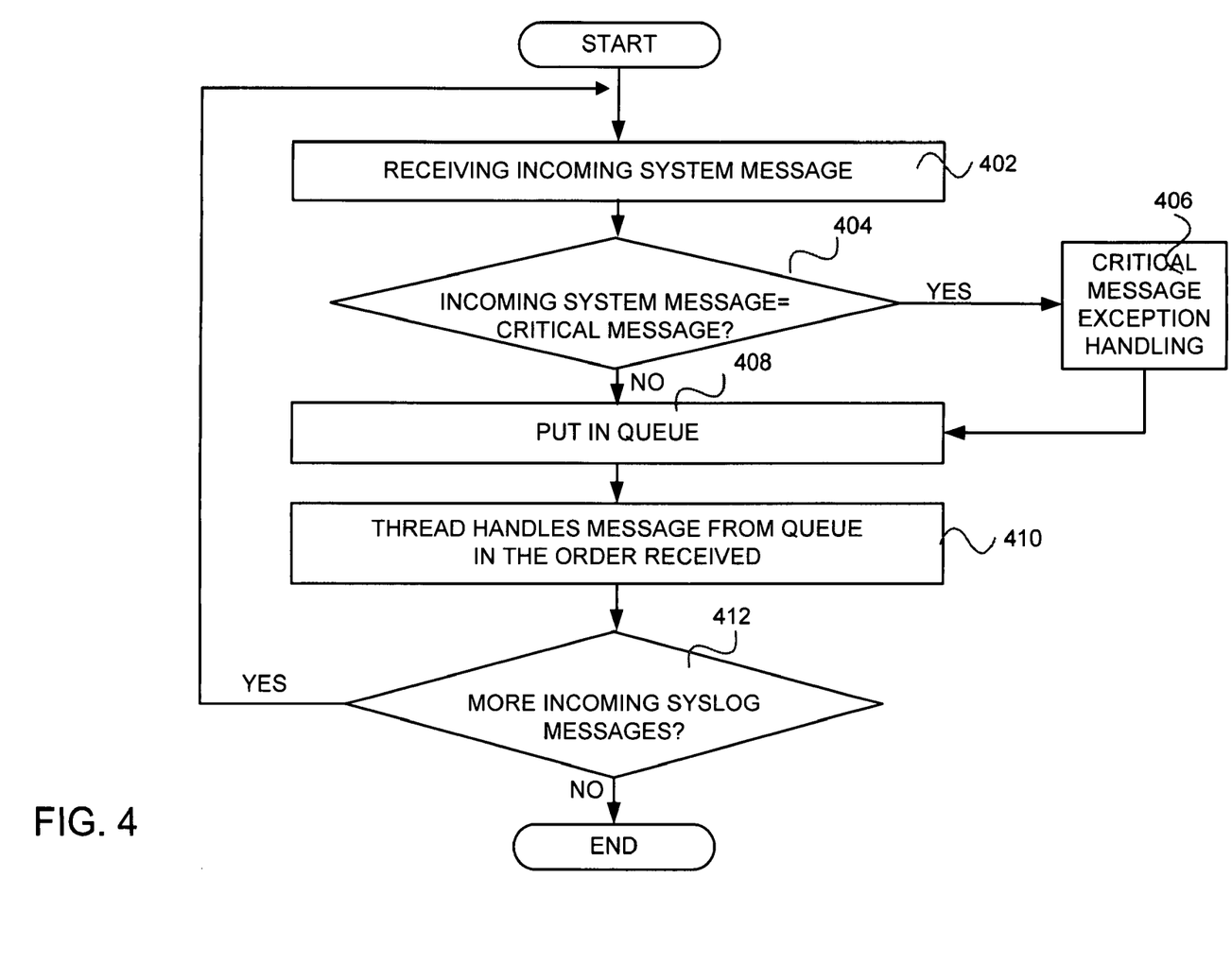
FIG. 4 shows, in an embodiment, a simplified flowchart illustrating how incoming syslog messages may be handled.

FIG. 4 shows, in an embodiment, a simplified flowchart illustrating how incoming syslog messages may be handled. At step 402, a syslog server receives an incoming syslog message. At step 404, the incoming syslog message is compared against a critical message regular expression. If there is no match, then at step 408, the syslog message is placed into a syslog queue. A thread then obtains the syslog messages from the queue in the order received and passes the syslog messages to the processor for handling.

If at step 404, the incoming syslog message matches the critical message regular expression then, at step 406, critical message exception handling occurs. The syslog queue is cleared and the incoming critical message is placed into the syslog queue at step 408. Since the critical syslog message is the message at the front of the syslog queue, a thread retrieves the critical syslog message from the syslog queue for immediate handling by the processor.

As mentioned above, each incoming syslog message is checked for validity because a malformed syslog message can be detrimental to the system. Parsing, a method used in the prior art to validate syslog messages, is inefficient. The validation process may be more efficient by comparing incoming syslog messages against a meta regular expression using a pattern-matching algorithm. As aforementioned, a meta regular expression is an expression that combines all the possible valid combinations of regular expressions that may be found in a standard regular expression library. Regular expressions may be generated based on the standards for a syslog message as defined in RFC 3164.

Currently, a standard regular expression library exists that defines the common syntaxes that may be used to form regular expressions. Table 1 illustrates some of the syntaxes that may appear in a regular expression.

TABLE 1

Common syntaxes of Regular Expressions

| Syntaxes | Definition |
|---|---|
| <, >, Feb, 1 | examples of alpha numeric characters |
| \d | any digit |
| \s | space |
| . | any character |
| * | repeating character |
| .* | any character repeating |
| \S | non-whitespace character |
| x{m, n} | x at least m times, but no more than n times (in the range) |
| ( ) | grouping |
| \| | or |
| x{n} | x exactly n times |

Figure 5:
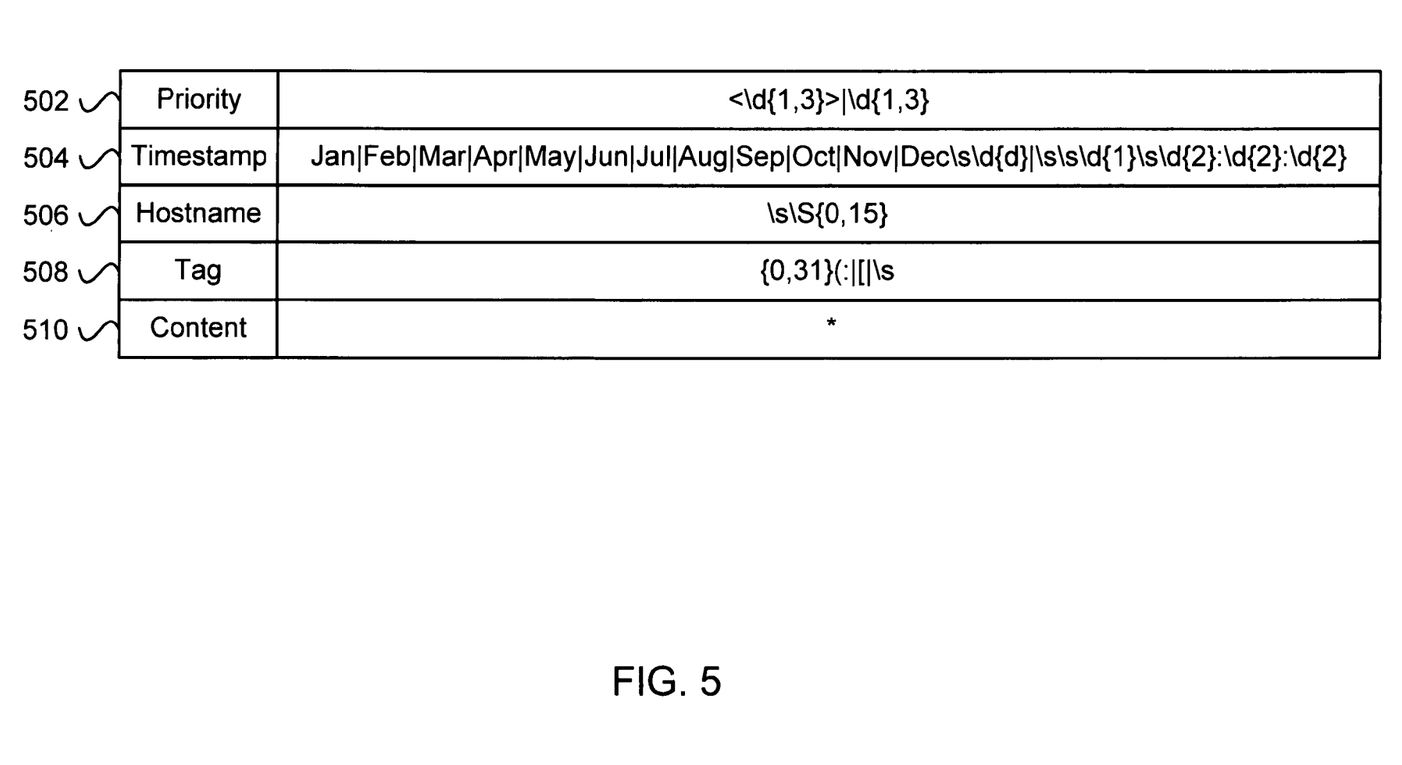
FIG. 5 shows, in an embodiment, an example of a regular expression.

FIG. 5 shows, in an embodiment, how the syntaxes in Table 1 may be used to create regular expressions. As mentioned before, regular expressions may be generated if the format of a syslog message is known. The following subcomponents of a meta regular expression (e.g. regular expressions) are based on the current standards as defined in the RFC 3164.

Subcomponent 502 represents an example of a regular expression for the priority field using the syntax in Table 1. This regular expression defines a priority field as having either one to three digits within left and right angle brackets or one to three digits without angle brackets.

Subcomponent 504 represents an example of a regular expression for a timestamp field. As mentioned before, the timestamp field is part of a header field. According to this regular expression, the timestamp field first must be one of the twelve valid months. The month is separated from the day by a space. The day may be either two digits or a space and one digit. The day is separated from the time by a space. The time represents the hour, minute, and second and is shown as three sets of two digits separated by a colon.

Subcomponent 506 represents an example of a regular expression for a hostname field. Hostname field is also part of a header field. According to this regular expression, a hostname field is separated from a timestamp field by a space. The hostname field is a non-white space value that may be zero to 15 characters long. Since the hostname field may be an IP address, a DNS name, or a variation of other, actual content may not be checked.

Subcomponent 508 represents an example of a regular expression for a tag field. As mentioned before, a tag field is part of a message field. According to this regular expression, a tag field is separated from a hostname field by a space. The tag field is any value from zero to 31 characters long. The tag field is followed either by a colon, a bracket, or a space.

Subcomponent 510 represents an example of a regular expression for a content field. The content field is also part of a message field. According to this regular expression, a content field may be any character repeating.

These regular expressions may be joined to form a plurality of message component patterns. As mentioned before, each message component pattern refers to a different ordering of individual regular expressions. For example, a message component pattern that may be generated based on the subcomponents mentioned above may have the following pattern: subcomponents 502, 504, 506, 508, and 510 (see string below for an example of a message component pattern).

(<\d{1,3}>|\d{1,3})
(Jan|Feb|Mar|Apr|May|Jun|Jul|Aug|Sep|Oct|Nov|Dec)
(\s\d{2}|\s\s\d{1})\s\d {2}:\d{2}:\d{2}\s\S{0,15}\s.{0,31}(:|[|\s).*

Table 2 below provides some additional examples of message component patterns. Using message component patterns, embodiment of the invention allows for a plurality of message component patterns to be combined to form a meta regular expression. Depending upon the combination of all the possible message component patterns, a meta regular expression may become fairly extensive.

TABLE 2

Message Component Patterns

| Position 1 | Position 2 | Position 3 | Position 4 | Position 5 |
|---|---|---|---|---|
| 502 | 504 | 506 | 508 | 510 |
| 502 | 506 | 504 | 508 | 510 |
| 502 | 508 | 504 | 506 | 510 |
| 502 | 510 | 504 | 506 | 508 |
| 502 | 506 | 508 | 504 | 510 |
| 502 | 508 | 510 | 504 | 506 |
| 502 | 506 | 508 | 510 | 504 |
| 502 | 508 | 510 | 506 | 504 |
| 502 | 510 | 508 | 506 | 504 |

By comparing incoming syslog messages against a meta regular expression, the system is able to determine whether or not incoming syslog messages are valid. For example, if an incoming syslog message matches one of the message component patterns in the meta regular expression, the syslog message is considered valid. Instead of doing programmatic parsing, a programmer is now generating a meta regular expression that allows for a one-to-one comparison to occur when an incoming syslog message is received. The programming language used to code the meta regular may be a cross platform language such as Java or Pearl.

For example, a device sends a syslog message (e.g., <12> Mar 12 22:22:02 128.0.0.1 HP012X2: this is a test) to a syslog server. When the syslog message is received, the complete syslog message is compared against a meta regular expression (e.g., (((<\d{1,3}>|\d{1,3} )(Jan|Feb|Mar|Apr|May|Jun|Jul|Aug|Sep|Oct|Nov|Dec) (\s\d{2}|\s\s\d{1})\s\d{2}:\d{2}:\d{2}\s\S{0,15}\s.{0,31}(: |[|\s).*))((<\d{1,3}>|\d{1,3})\s\S{0,15} (Jan|Feb|Mar|Apr|May|Jun|Jul|Aug|Sep|Oct|Nov|Dec) (\s\d{2}|\s\s\d{1})\s\d{2}:\d{2}:\d{2}\s.{0,31}(:|[|\s).*))). In this example, the meta regular expression is a combination of two message component patterns. In an actual implementation, the number of message component patterns combined in a meta regular expression may vary as required to cover all possible orderings of syslog message subcomponents. A one-to-one comparison is performed and the incoming syslog message matches one of the various message component patterns shown in the meta regular expression; thus, the syslog message is considered valid and the message is processed.

In another example, assume that the syslog server receives a malformed syslog message (e.g., <12> Mar 012 22:22:02 128.0.0.1 HP012X2: this is a bad message). The syslog message is compared against a meta regular expression (such as the one in the above example). The syslog message has a message component (e.g., date field 012) that does not match any of a plurality of message components that may be found in the meta regular expression and is considered invalid by the syslog server. As a result, the malformed syslog message is discarded and error handling may occur.

Changes to either the standard regular expression library or to the standards for a syslog message may be accommodated using regular expressions. For example, the syntax \S may at some point be considered an invalid syntax in the standard regular expression library. Instead, \S is replaced by \W. To accommodate this change, a programmer replaces \S with \W in all the regular expressions. In the prior art, a programmer might have to review the parsing algorithm and make sure that the changes are accounted for in all the codes.

Figure 6:
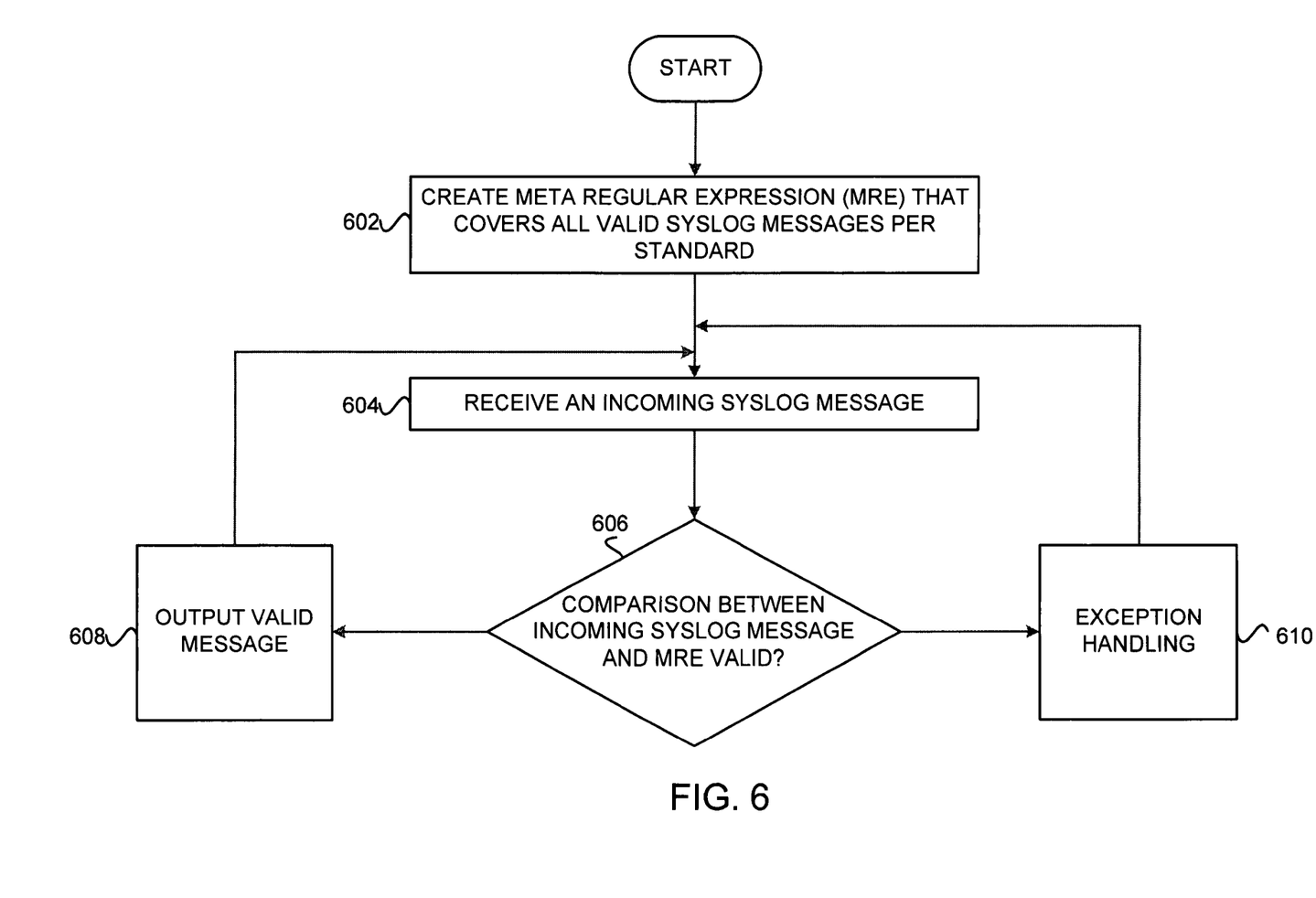
FIG. 6 shows, in an embodiment, a simplified flowchart illustrating how meta regular expression may be employed to validate an incoming syslog message.

FIG. 6 shows, in an embodiment, a simplified flowchart illustrating how a meta regular expression may be employed to validate an incoming syslog message. At step 602, a meta regular expression is generated that covers all possible valid syslog messages per standard regular expression library. As discussed above, once all possible formats for valid syslog messages are identified, a programmer can code for all valid regular expressions and can generate all the possible message component patterns to generate a meta regular expression.

At step 604, the CPU receives an incoming syslog message from the syslog queue. At step 606, the syslog server compares the incoming syslog message against the meta regular expression. If there is a match, the syslog server processes the incoming syslog message and notifies the sender (step 608) that the syslog message has been received successfully. The system then returns to step 604 to retrieve the next incoming syslog message from the syslog queue.

However, if the comparison between the incoming syslog message and the meta regular expression does not produce a match, the syslog server proceeds to step 610 and exception handling is performed. For example, exception handling may involve discarding the syslog message and logging the details of the invalid syslog message receipt. Once exception handling has been performed, the CPU is ready to receive the next incoming syslog message (step 604).

As can be appreciated from the foregoing, embodiments of the invention provide for a method for handling critical syslog messages immediately without having to wait for the processor to handle all the syslog messages that have been received prior to the receipt of the critical syslog message. Further, by removing the syslog messages from a limited-space buffer to a syslog queue that has more storage prevents the system from accidentally dropping syslog messages. Also, incorporating pattern-matching algorithm using a meta regular expression to determine the validity of a syslog message allows for quicker processing to occur, thus, allowing for more throughput.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer system, a method for processing syslog messages, said syslog messages being received from a plurality of components, comprising:
   receiving a first syslog message;
   determining by a syslog server of the computer system whether said first syslog message is one of a plurality of critical syslog messages;
   if said first syslog message is not any of said plurality of critical syslog messages,
      placing said first syslog message in a syslog queue by the syslog server, the syslog queue having one or more other syslog messages already stored in said syslog queue, said syslog queue processed on a first-in, first-out basis, such that said first syslog message is retrieved from said syslog queue and processed after said other syslog messages already stored in said syslog queue are retrieved from said syslog queue and processed;
   if said first syslog message is said one of said plurality of critical syslog messages,
      clearing said one or more other syslog messages from said syslog queue by said syslog server, and placing said first syslog message in said syslog queue by said syslog server after said one or more other syslog messages have been cleared from said syslog queue, such that said first syslog message is retrieved next from said syslog queue and processed,
   wherein said first syslog message is processed by a processor of the computer system in a same way regardless of whether said first syslog message is said one of said plurality of critical syslog messages after said first syslog message has been retrieved from said syslog queue by said processor.

2. The method of claim 1 wherein said determining including detecting the presence of a unique string in said first syslog message, said unique string indicating that said first syslog message is said one of said plurality of critical messages.

3. The method of claim 1 wherein said determining including detecting the presence of a critical message regular expression in said first syslog message, said critical message regular expression indicating that said first syslog message is said one of said plurality of critical messages.

4. The method of claim 3 wherein said critical message regular expression is formed based on syslog message standards defined in Request for Comments (RFC) 3164.

5. An article of manufacture comprising a program storage medium having computer readable code embodied therein, said computer readable code being configured to process syslog messages received from a plurality of components, comprising:
   computer readable code for receiving a first syslog message;
   computer readable code for determining whether said first syslog message is one of a plurality of critical syslog messages;
   computer readable code for, if said first syslog message is not any of said plurality of critical syslog messages, placing said first syslog message in a syslog queue, the syslog queue having one or more other syslog messages already stored in said syslog queue, said syslog queue processed on a first-in, first-out basis, such that said first syslog message is retrieved from said syslog queue and processed after said other syslog messages already stored in said syslog queue are retrieved from said syslog queue and processed;
   computer readable code for, if said first syslog message is said one of said plurality of critical syslog messages, clearing said one or more other syslog messages from said syslog queue and placing said first syslog message in said syslog queue after said one or more other syslog messages have been cleared from said syslog queue, such that said first syslog message is retrieved next from said syslog queue and processed;
   computer readable code for retrieving and processing said first syslog message from said syslog queue in a same way regardless of whether said first syslog message is said one of said plurality of critical syslog messages after said first syslog message has retrieved from said syslog queue.

6. The article of manufacture of claim 5 wherein said computer readable code for determining including computer readable code for detecting the presence of a unique string in said first syslog message, said unique string indicating that said first syslog message is said one of said plurality of critical messages.

7. The article of manufacture of claim 5 wherein said computer readable code for determining including computer readable code for detecting the presence of a critical message regular expression in said first syslog message, said critical message regular expression indicating that said first syslog message is said one of said plurality of critical messages.

8. The article of manufacture of claim 7 wherein said critical message regular expression is formed based on syslog message standards defined in Request for Comments (RFC) 3164.

9. A computer system comprising:
a syslog queue to store a plurality of syslog messages;
a processor to retrieve the syslog messages from the syslog queue on a first-in, first-out basis and to process the syslog messages upon retrieving the syslog messages from the syslog queue;
a syslog server to receive a first syslog message, to determine whether the first syslog message is one of a plurality of critical syslog messages, and to
if the first syslog message is not any of the plurality of critical syslog messages,
place the first syslog message in the syslog queue behind any other syslog messages already stored in the syslog queue, such that the first syslog message is retrieved from the syslog queue and processed by the processor after the other syslog messages already stored in the syslog queue have been retrieved from the syslog queue and processed by the processor;
if the first syslog message is the one of a the plurality of critical syslog messages,
clear any other syslog messages already stored in the syslog queue, and after clearing any other syslog messages already stored in the syslog queue, place the first syslog message in the syslog queue, such that the first syslog message is retrieved next from the syslog queue and processed by the processor,
wherein the processor is, after retrieving the syslog messages from the queue, to process the syslog messages in a same way regardless of whether the syslog messages are critical syslog messages or not.

10. The computer system of claim 9, wherein the syslog server is to determine whether the first syslog message is the one of the plurality of critical syslog messages by detecting a presence of a unique string in the first syslog message, the unique string indicating that the first syslog message is the one of the plurality of critical messages.

11. The computer system of claim 9, wherein the syslog server is to determine whether the first syslog message is the one of the plurality of critical syslog messages by detecting a presence of a critical message regular expression in the first syslog message, the critical message regular expression indicating that the first syslog message is the one of the plurality of critical messages.

12. The computer system of claim 11, wherein the critical message regular expression is formed based on syslog message standards defined in Request for Comments (RFC) 3164.

\* \* \* \* \*

UNITED STATES PATENT AND TRADEMARK OFFICE
CERTIFICATE OF CORRECTION

PATENT NO. : 7,624,177 B2  
APPLICATION NO. : 11/137885  
DATED : November 24, 2009  
INVENTOR(S) : Neeshant Desai et al.

It is certified that error appears in the above-identified patent and that said Letters Patent is hereby corrected as shown below:

In column 14, line 4, in Claim 9, after "of" delete "a".

Signed and Sealed this

Fourth Day of May, 2010

David J. Kappos  
*Director of the United States Patent and Trademark Office*